United States Patent
De Mangelaere et al.

(10) Patent No.: US 6,239,882 B1
(45) Date of Patent: May 29, 2001

(54) METHOD AND APPARATUS FOR SCANNING ORIGINAL IMAGES

(75) Inventors: Peter De Mangelaere, Mortsel (BE); John F. Omvik, North Andover; Earle B. Stokes, Westford, both of MA (US); Chris Tuijn, Mortsel (BE); Dana M. Winikates, West Roxbury, MA (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 08/868,685

(22) Filed: Jun. 4, 1997

(51) Int. Cl.$^7$ .................................................... H04G 1/40
(52) U.S. Cl. ................................ 358/474; 358/452
(58) Field of Search ......................... 358/474, 479, 358/482, 483, 487, 452

(56) References Cited

U.S. PATENT DOCUMENTS

| | | | |
|---|---|---|---|
| 4,751,583 | * | 6/1988 | Levine ................................ 358/256 |
| 5,055,941 | * | 10/1991 | Suzuki ................................ 358/450 |
| 5,539,523 | * | 7/1996 | Nakai et al. ........................ 358/296 |
| 5,612,796 | * | 3/1997 | DeCook et al. ..................... 348/527 |

FOREIGN PATENT DOCUMENTS

| | | | |
|---|---|---|---|
| 0 464 523 | 1/1992 | (EP) | ............................... H04N/1/46 |
| WO 92/05668 | 4/1992 | (WO) | ............................... H04N/9/11 |

* cited by examiner

Primary Examiner—Jerome Grant, II
(74) Attorney, Agent, or Firm—John A. Merecki; Edward L. Keley

(57) ABSTRACT

A method and apparatus is provided for scanning original images wherein the original images are scanned by a scanner and processed in a computer workstation. The scanning of an original image is carried out simultaneously with the processing of at least one other original image. A method and apparatus for scanning an original image wherein the original image is scanned in bands by a scanner and processed in a computer workstation. The scanning of one band is carried out simultaneously with the processing of at least one other band.

28 Claims, 5 Drawing Sheets

METHOD AND APPARATUS FOR SCANNING ORIGINAL IMAGES

TECHNICAL FIELD

The field of the invention is the use of digital scanning systems in the electronic prepress and photographic industries. The invention relates specifically to the scanning and image processing of original images in a production environment

BACKGROUND ART

As the electronic pre-press industry has evolved, image quality expectations have increased greatly, thereby involving the use of ever more expensive scanning and processing equipment. Efficient work flow and productivity involves keeping the scanning functioning at the highest possible duty cycle performing productive work. Increasingly, the scanning process and the post-scanning image processing become the determinants to the rate at which original images can be processed by a facility providing these services.

The primary components of a scanning system include a computer workstation and a scanner. The traditional work flow steps for scanning multiple original images has been to perform a series of operations that are completed sequentially in order to process the next image. These steps include: 1) cleaning and mounting the original images in the scanner 2) performing an initial low-resolution scan of the original images to obtain digital data representations of the images 3) electronically selecting specific areas of the images to be processed (i.e., cropping) 4) performing a preview scan of the selected areas 5) editing the preview scan which might include color correction, rotation, scaling, etc. 6) performing a final scan of the image and 7) electronically storing the image data or directing the final scan information to an output device such as a printer. Steps three (3) through seven (7) are then repeated for each original image. Typically, the operator is idle during the preview and final scan, and while the image is being electronically stored or directed to an output device. Also, the scanner is inactive while the operator evaluates and edits each preview scan. This results in substantial loss to the output capacity in traditional scanning systems.

The traditional work flow steps for scanning a single original image include the following: 1) the computer workstation requests that the scanner perform a scan of a first band or portion of the image 2) the computer workstation waits for the band to be scanned 3) the scanned band information is retrieved from the scanner by the computer workstation 4) the scanned band information is then processed and saved in the computer workstation or directed to an output device and 5) the computer workstation requests the scanner to scan the next band of the image. Steps two (2) through five (5) are then repeated for all the bands of the original image. The problem with these workflow steps is that the computer workstation and the scanner are not performing operations simultaneously at any given time which results in reduced productivity in the scanning system.

It is accordingly a primary object of the invention that image processing operations can be carried out in parallel with scanning operations.

It is another object that the invention provide a method for scanning and post-scanning processing in a high-productivity scanning system.

SUMMARY DISCLOSURE OF THE INVENTION

In accordance with the invention, a method is provided for scanning original images comprising the steps of performing an initial low-resolution scan of the original images to obtain a plurality of low-resolution digital data representations of the original images, selecting at least two original images based on the low-resolution digital data representations for performing a secondary scan thereon, performing the secondary scan on the at least two original images thereby creating a secondary digital representation of the at least two original images and preparing one of the at least two original images for further scanning while simultaneously scanning at least one other of the at least two original images for scanning. The method also includes the steps of preparing the original image for scanning after obtaining the secondary digital representation, thereby creating a prepared image which is ready for final scanning and scanning the prepared image while simultaneously preparing at least one other original image for scanning. After the prepared imaged is finally scanned, it is automatically archived.

A method is also provided for scanning an original image to obtain the digital data representation of the original image, this method comprising the steps of scanning a plurality of portions of the original image at least once to obtain a plurality of digital data representations and processing each of the plurality of digital data representations thereby creating a plurality of processed digital data representations of the plurality of portions, wherein the scanning of at least one of the plurality of portions occurs simultaneously with the processing of at least one of the plurality of digital data representations. This method further comprises the step of archiving the plurality of processed digital data representations.

An apparatus is provided for scanning original images, comprising an input preparation station for preparing original images for scanning and a scanner for scanning an original image simultaneously with the preparation of another original image for scanning. The input preparation station may include a computer workstation having a foreground and a background and a user-interface in the foreground for viewing and preparing the original images. The input preparation station may further include a scanner driver for controlling the scanner, wherein the scanner driver includes a queue device in the background for storing the prepared plurality of images, the queue device operating simultaneously with the user-interface. The scanner provides a digital representation of each scanned original image and the input preparation station may further comprise a storage device for storing the digital data representations. The apparatus may further comprise a drive device for driving the input preparation station.

An apparatus is also provided for scanning an original image to obtain the digital data representation of the original image, the apparatus comprising a scanner for scanning a plurality of portions of the original image at least once to obtain digital data representations of each of the portions of the original image and a computer workstation comprising a processor for processing the digital data representations of the original image wherein the processor processes the digital data representations of the scanned portions simultaneously with the scanning of at least one other portion of the original image.

BRIEF DESCRIPTION OF THE DRAWINGS

The objects and features of the invention will best be understood from a detailed description of the invention and a preferred embodiment thereof selected for the purposes of illustration and shown in the accompanying drawings in which.

DETAILED DESCRIPTION OF THE INVENTION

Figure 1A:
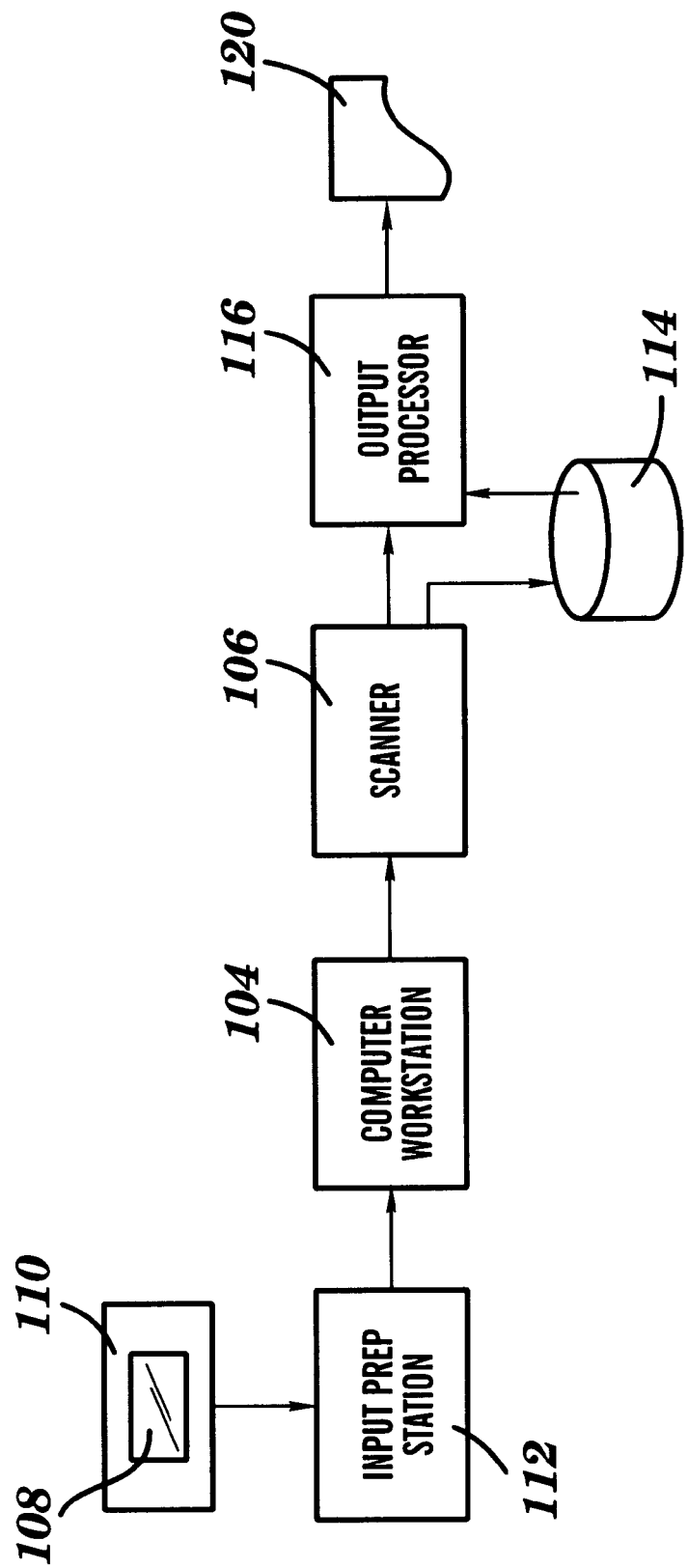
FIG. 1A shows a system block diagram of a scanning system according to the prior art.

Turning now to the drawings, the invention will be explained in detail. FIG. 1A shows a system block diagram of a scanning system according to the prior art. The system comprises an input preparation station 112, a computer workstation 104, and a scanner 106. Preparations are carried out by an operator (not shown) first at the input preparation station 112, and include physical mounting of an original image 108, as well as cropping by masking or digitizing, and rotation— if required— by physically mounting at an angular disposition within the original holder (or drum) 110. After using scanner 106 to obtain a low-resolution preview scan, further preparations and refinements are carried out by the operator using the front-end workstation 104 for final cropping of the preview scanned image, and adjustment of color levels and balance.

Once these operations have been completed in the system of FIG. 1A, a final scan at high resolution can be carried out in scanner 106 using the information passed to it for control purposes and data correction. In the drawing, this link is accomplished using a workstation 104, although direct manual input to the scanner is often used, depending upon the sophistication of the scanning system. An image 108 scanned in this manner can be retained in a digital data storage system 114, or can be outputted directly using output processor 116 for formatting and control of an output device 120. The output processor 116 typically applies a digital halftoning screen to the continuous tone image data. The output device 120 is typically a device such as an imagesetter or printer. In this system, the productivity of the operator is limited by the rate at which the scanner 106 and computer workstation 104 can scan and process images 108 simultaneously. Aside from mounting operations, which can be done in parallel with actual scanning, the operator must necessarily spend a significant portion of time waiting for scans, preview or final, to be completed.

Figure 2:
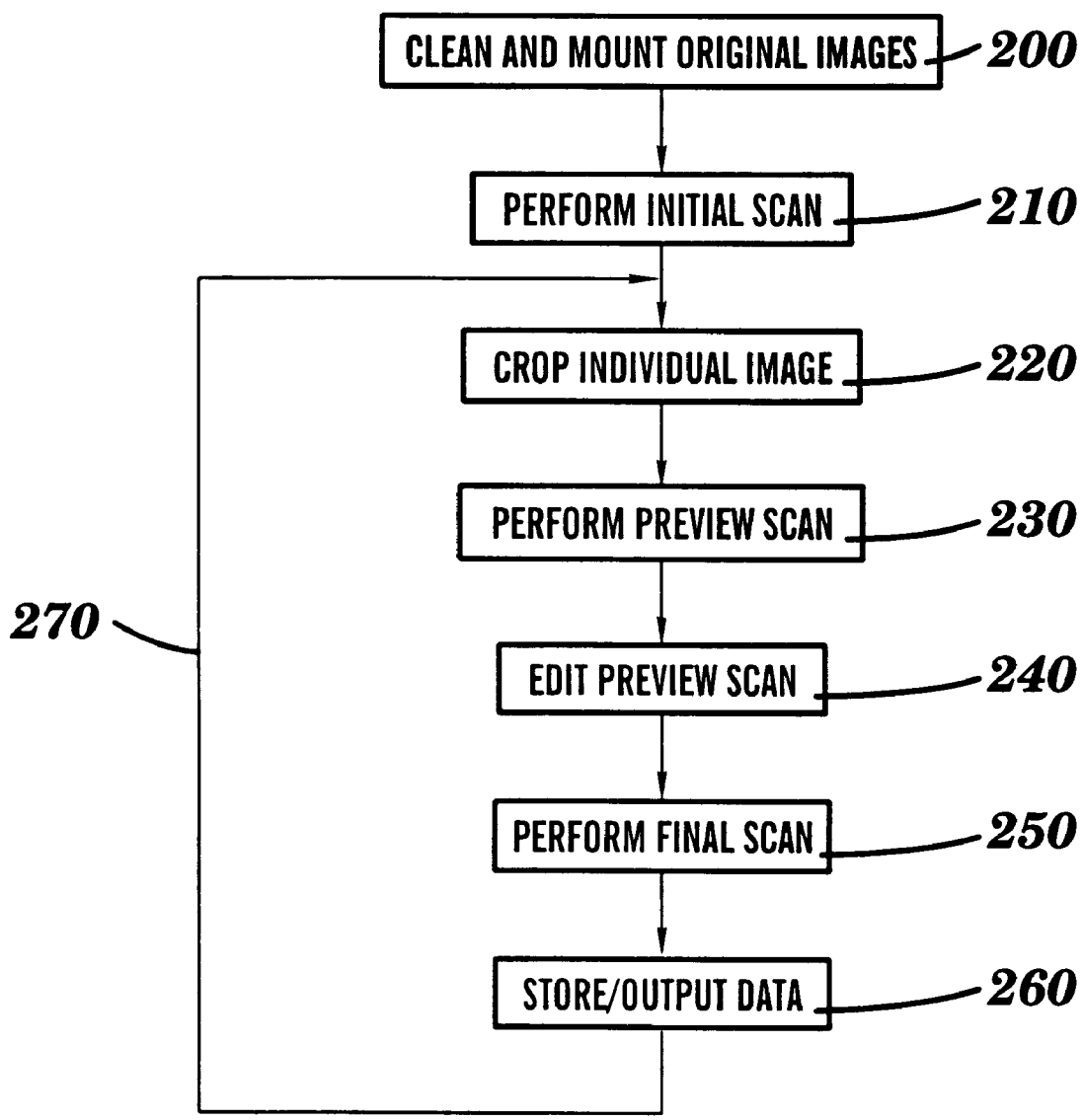
FIG. 2 shows a block diagram of work flow steps for scanning multiple images according to the prior art.

Turning to FIG. 2, a block diagram illustrates the serial steps utilized in traditional systems to scan and store multiple images 108. The first step 200 is to clean and mount the original images 108 in a holder 110. An initial scan is performed 210 by the scanner 106 over the entire scannable area to obtain the digital data representation of the original images 108. The digital data representation of each image appears in a user-interface environment of the computer workstation 104 and a single image 108 is electronically cropped out 220 by the operator. The original image corresponding to the selected image is then scanned at low-resolution to obtain a secondary or preview scan 230 after which preparations, which might include editing 240, by the operator are performed. This preparing or editing step 240 might include color correction, rotation, scaling, etc. A final scan 250 is then performed on the original image 108 by the scanner 106 using information passed to it from the computer workstation 104 for control purposes and data correction. The final scan information is typically retained in a data storage system 114, which may include a storage device residing on the same computer workstation 104, but may be directed to an output device 120 such as a printer (not shown). If another image 108 is to be processed, the operator must follow path 270 and begin cropping another image 220 from the initial scan. The sequence of these work flow steps is undesirable because the operator must necessarily spend a significant portion of time waiting for scans, preview or final, to be completed.

Figure 1B:
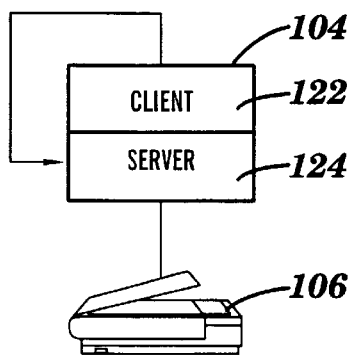
FIG. 1B shows a block diagram of the client/server architecture in accordance with the preferred embodiment of the invention.
Figure 1C:
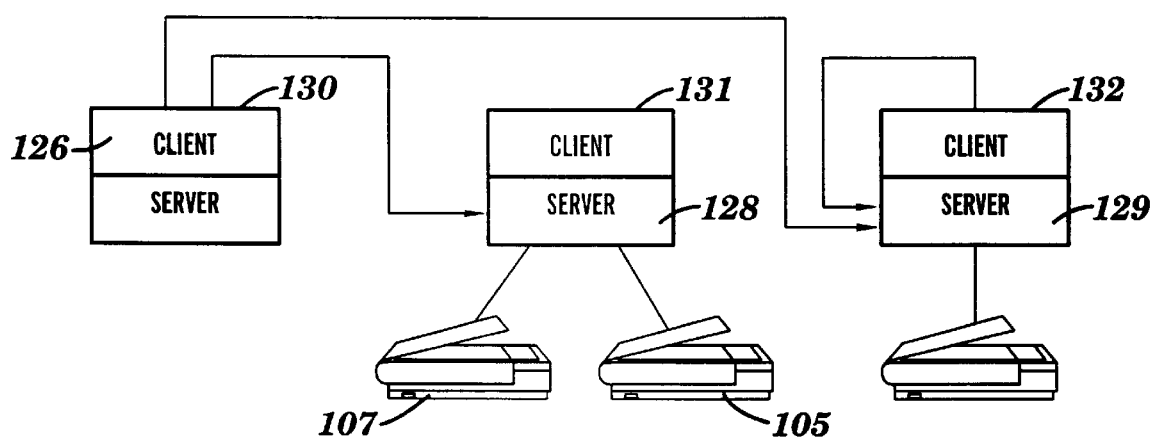
FIG. 1C shows a block diagram of the client/server architecture in an alternative embodiment of the present invention.

FIG. 1B shows a block diagram of a client/server architecture which may be used in accordance with the present invention. The client module 122 is a software module which controls the user interface and the server module 124 is a software module which controls the image processing and the scanner 106. The client 122 and server 124 modules may reside in the same computer workstation 104 as indicated by FIG. 1B. Turning to FIG. 1C, an alternative embodiment of the invention is shown. A client module 126 of a workstation 130 may be connected to a server module 128 located at a different computer workstation 131 or connected to two or more server modules 128, 129 located at two or more computer workstations 131, 132. Also, a single server module 128 may control more than one scanner 105, 107. It should be recognized that the client and server modules could be combined into a single software module. However, to combine them together would be much more difficult to program, especially when a client module 126 is connected to more than one server module 128, 129 or when a server module 128 is connected to more than one scanner 105, 107. Thus, this client/server architecture makes it substantially easier to program so that key workflow steps discussed below can be accomplished in parallel in accordance with the present invention.

Figure 3:
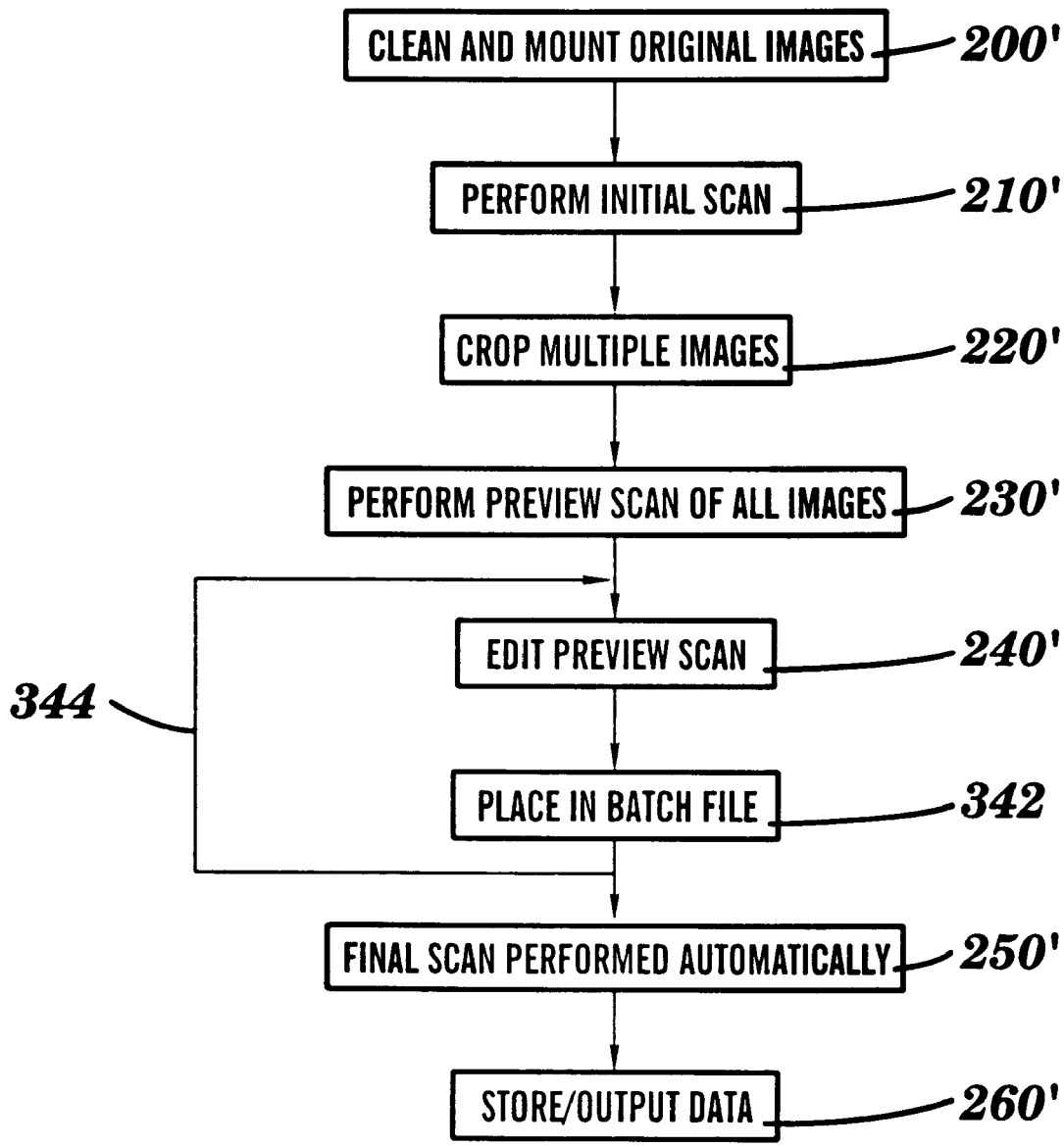
FIG. 3 shows a block diagram of workflow steps for scanning multiple images according to the present invention.

FIG. 3 shows a block diagram of workflow steps included to scan and store multiple images in accordance to the present invention. The original images 108 are first prepared, which might include cleaning and mounting the images 200' in the holder 110 and the entire scannable area is initially scanned 210' by scanner to obtain the digital data representation of the original images 108. The digital data representation of each image appears in a user-interface environment located in the foreground of the computer workstation 104. The present invention allows the operator to electronically select or crop the digital representation of multiple images 220' so that the original images 108 corresponding to the selected digital representations are sequentially scanned again to obtain a secondary or preview scan. Prior art workflow steps only allowed the operator to crop a single image 108 to be preview scanned. The scanned images appear in user-interface environment and the operator may begin to interactively edit or prepare 240' the digital data representation of the first image when it is finished being preview scanned. Upon completing editing the digital data representation of the first image, the operator places the edited image in a batch file or a queue device 342 which operates simultaneously in the background (not shown) of the user-interface. A final scan 250' is automatically performed on each original image corresponding to the edited image in the batch file and retained 260' in a storage system 114, which may include a storage device residing on the same computer workstation 104, or directed to an output device 260' such as a printer. It is also a feature of the invention that the batch file is modifiable after the edited images have been placed therein. In this manner, the operator may return 344 to editing the preview scans 240' while the scanner 106 performs 250' and saves 260' final scans of the images that were placed in the batch file. Thus, the present invention achieves greater output capacity than traditional system through parallel processing.

Figure 4:
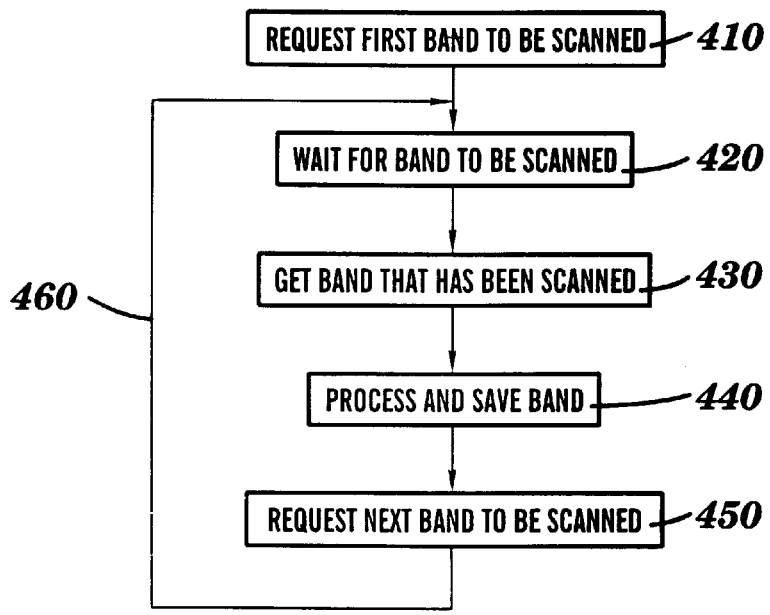
FIG. 4 shows a block diagram of workflow steps for scanning a single original image according to the prior art.

FIG. 4 shows the traditional work flow steps for scanning a single original image 108 according to the prior art. After the original image 108 has been mounted in the scanner 106, the computer workstation 104 requests that the scanner perform a scan of a first band of the image 410. The computer workstation 104 waits for the band to be scanned 420 and then retrieves the scanned band 430 from the scanner 106. The scanned band information is processed by a processor (not shown) in the computer workstation 104 and saved 440 in a storage device (not shown) which may reside on the same workstation. The computer workstation 104 requests the scanner 106 to scan the next band of the image 450. Path 460 is then followed until all the bands of the single original image have been scanned, processed, and saved. The problem with these workflow steps is that the computer workstation and the scanner 106 are not performing operations simultaneously which results in lost productivity in the scanning system. Thus, it would be advantageous to perform scanning operations and post-scanning operations simultaneously.

Figure 5:
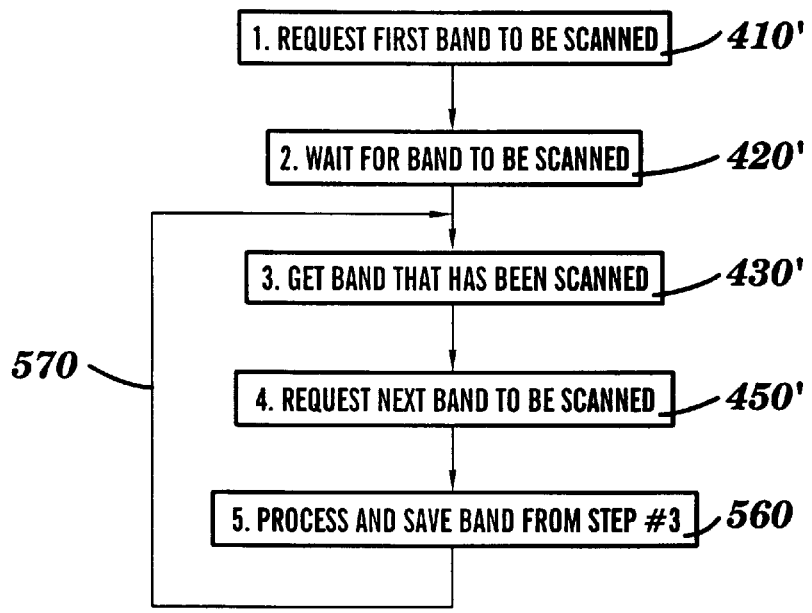
FIG. 5 shows a block diagram of workflow steps for scanning a single original image according to the present invention.

FIG. 5 shows the work flow steps for scanning a single original image 108 in accordance with the present invention. After the original image 108 has been mounted in the scanner 106, the computer workstation 104 (1) requests the scanner to perform a scan 410' of a first band of the image. The computer workstation 104 (2) waits for the band to be scanned 420' and then (3) retrieves the scanned band 430' from the scanner 106. Differing from the prior art, the computer workstation 104 (4) requests the scanner 106 to scan the next band of the image 450' before (5) processing and saving the band that has already been retrieved 560. A processor and storage device, which may reside on the same computer workstation 104, is used to perform the processing and store the processed band information, respectively. Steps three (3) through (5) are followed (path 570) until all the bands of the single original image have been scanned, processed, and saved. In this manner, the computer workstation 104 and the scanner 106 are performing operations simultaneously which results in greater productivity than traditional scanning systems.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breadth and spirit of the invention disclosed herein.

What is claimed is:

1. A scanning method, comprising the steps of:

positioning a plurality of original images within a scannable area;

performing an initial scan of the scannable area to produce a digital data representation of the scannable area;

selecting at least two of the original images for further scanning by selecting a digital data representation of each of the selected original images from the digital data representation of the scannable area;

performing a preview scan of each of the selected original images to produce a second digital data representation of each of the selected original images;

simultaneously editing the second digital data representation of one of the selected original images while performing the preview scan of a subsequent selected original image;

storing the edited, second digital data representation of each of the selected original images in a batch file; and performing a final scan on each selected original image having an edited, second digital data representation stored in the batch file.

2. The scanning method according to claim 1, wherein the final scan is performed automatically.

3. The scanning method according to claim 1, further including the step of:

archiving a digital data representation of the final scan of each selected original image.

4. The scanning method according to claim 1, further including the step of:

outputting a digital data representation of the final scan of each selected original image.

5. The scanning method according to claim 1, wherein the step of positioning the original images within the scannable area further includes the step of:

cleaning the plurality of original images before positioning the original images within the scannable area.

6. The scanning method according to claim 1, wherein the step of positioning the original images within the scannable area further includes the step of:

mounting the plurality of original images to a holder.

7. The scanning method according to claim 1, wherein the step of positioning the original images within the scannable area further includes the step of:

cropping at least one of the plurality of original images.

8. The scanning method according to claim 1, wherein the step of selecting at least two of the original images for further scanning further includes the step of:

electronically cropping the digital data representation of each of the selected original images from the digital data representation of the scannable area.

9. The scanning method according to claim 1, wherein the preview scans of the selected original images are performed sequentially.

10. A scanning method, comprising the steps of:

positioning a plurality of original images within a scannable area;

performing an initial scan of the scannable area to produce a digital data representation of the scannable area;

selecting at least two of the original images for further scanning by selecting a digital data representation of each of the selected original images from the digital data representation of the scannable area;

performing a preview scan of each of the selected original images to produce a second digital data representation of each of the selected original images;

simultaneously editing the second digital data representation of one of the selected original images while performing the preview scan of a subsequent selected original image;

storing the edited, second digital data representation of each of the selected original images in a modifiable batch file; and performing a final scan on each selected original image having an edited, second digital data representation stored in the modifiable batch file.

11. The scanning method according to claim 10, wherein the final scan is performed automatically.

12. The scanning method according to claim 10, further including the step of:

archiving a digital data representation of the final scan of each selected original image.

13. The scanning method according to claim 10, further including the step of:

outputting a digital data representation of the final scan of each selected original image.

14. The scanning method according to claim 10, wherein the step of positioning the original images within the scannable area further includes the step of:

cleaning the plurality of original images before positioning the original images within the scannable area.

15. The scanning method according to claim 10, wherein the step of positioning the original images within the scannable area further includes the step of:

mounting the plurality of original images to a holder.

16. The scanning method according to claim 10, wherein the step of positioning the original images within the scannable area further includes the step of:

cropping at least one of the plurality of original images.

17. The scanning method according to claim 10, wherein the step of selecting at least two of the original images for further scanning further includes the step of:

electronically cropping the digital data representation of each of the selected original images from the digital data representation of the scannable area.

18. The scanning method according to claim 10, wherein the preview scans of the selected original images are performed sequentially.

19. A scanning method, comprising the steps of:

positioning a plurality of original images within a scannable area;

performing an initial scan of the scannable area to produce a digital data representation of the scannable area;

selecting at least two of the original images for further scanning by selecting a digital data representation of each of the selected original images from the digital data representation of the scannable area;

performing a preview scan of each of the selected original images to produce a second digital data representation of each of the selected original images;

simultaneously editing the second digital data representation of one of the selected original images while performing the preview scan of a subsequent selected original image; and performing a final scan on each selected original image after editing of the second digital data representation of the corresponding original image.

20. The scanning method according to claim 19, wherein the final scan is performed automatically after completion of the editing of the second digital data representation of each corresponding original image.

21. The scanning method according to claim 19, further including the step of:

archiving a digital data representation of the final scan of each selected original image.

22. The scanning method according to claim 19, further including the step of:

outputting a digital data representation of the final scan of each selected original image.

23. The scanning method according to claim 19, wherein the step of positioning the original images within the scannable area further includes the step of:

cleaning the plurality of original images before positioning the original images within the scannable area.

24. The scanning method according to claim 19, wherein the step of positioning the original images within the scannable area further includes the step of:

mounting the plurality of original images to a holder.

25. The scanning method according to claim 19, wherein the step of positioning the original images within the scannable area further includes the step of:

cropping at least one of the plurality of original images.

26. The scanning method according to claim 19, wherein the step of selecting at least two of the original images for further scanning further includes the step of:

electronically cropping the digital data representation of each of the selected original images from the digital data representation of the scannable area.

27. The scanning method according to claim 19, further including the step of:

storing the edited, second digital data representation of each of the selected original images in a batch file.

28. The scanning method according to claim 19, wherein the preview scans of the selected original images are performed sequentially.

* * * * *